Nov. 18, 1958 P. E. HAWKINSON 2,860,682
PNEUMATIC TIRE CASING

Filed Aug. 24, 1956 3 Sheets-Sheet 1

INVENTOR
Paul E. Hawkinson
BY Merchant & Merchant
ATTORNEYS

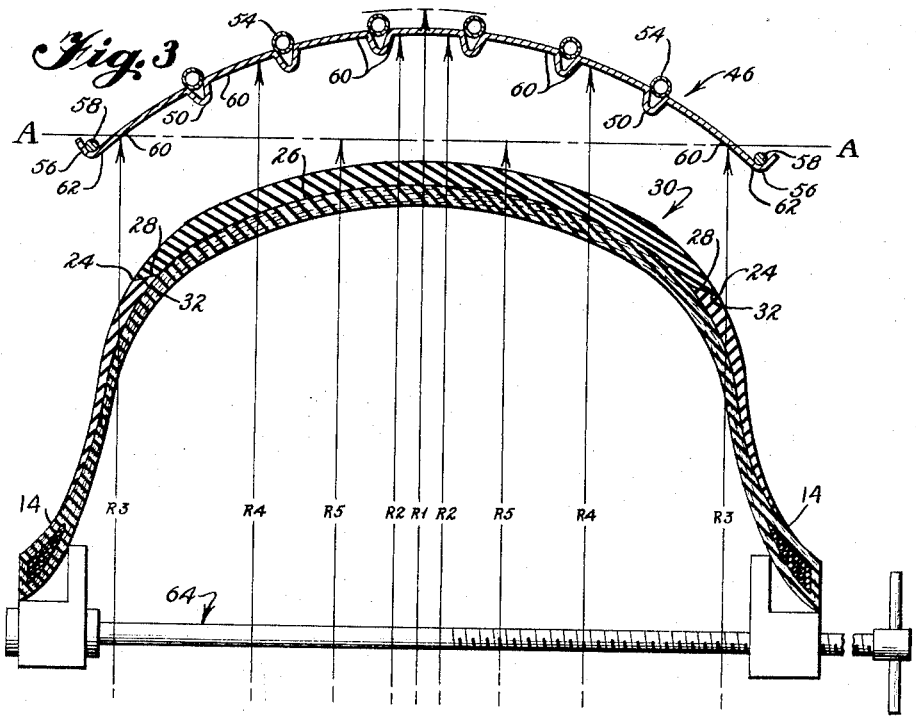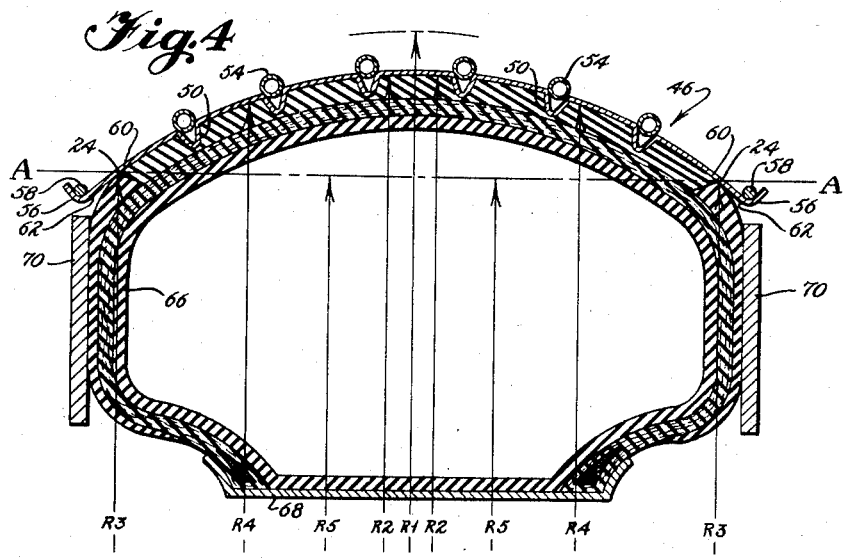

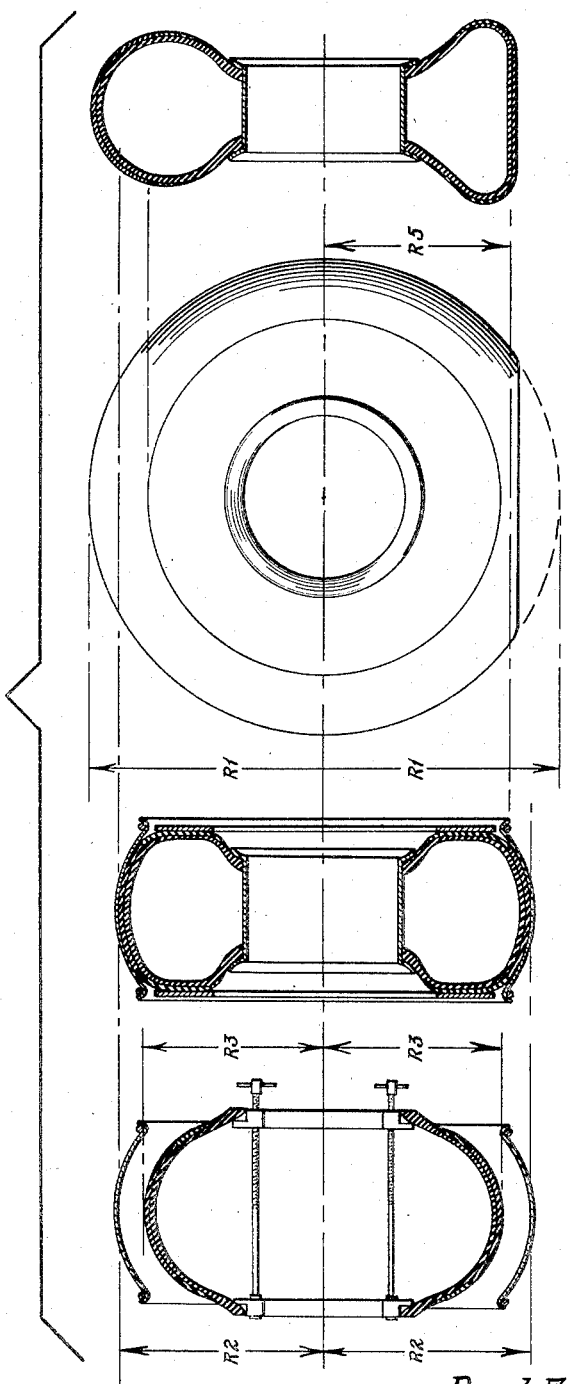

United States Patent Office 2,860,682
Patented Nov. 18, 1958

2,860,682
PNEUMATIC TIRE CASING

Paul E. Hawkinson, deceased, late of Minneapolis, Minn., by Francis W. Gaasedelen, administrator, Minneapolis, Minn., assignor to Paul E. Hawkinson Company, Minneapolis, Minn., a corporation of Minnesota Application August 24, 1956, Serial No. 605,965

3 Claims. (Cl. 152—354)

This invention relates to a mold and a method of applying new tread material to a worn pneumatic tire casing; and to a tire casing which has been retreated in accordance with such method and in particular to a mold, method of retreading and to retreaded tire casings of the so-called shoulderless type, such as airplane tires.

This is a continuation-in-part of my co-pending application Serial No. 288,677, filed May 19, 1952, entitled "Method of Treading Tire Casings," now abandoned.

It has long been a problem in the industry to satisfactorily and successfully retread a low pressure shoulderless type pneumatic tire casing. The difficulty involved is caused by the necessity of providing such worn tire casings with a renewed transversely arcuate road-engaging tread portions which extends transversely throughout a relatively greater arcuate distance of the shoulderless tire casing than is required in the retreading of conventional automobile or truck tires by molds and processes developed by me which are covered by patents, such as Nos. 1,917,261, Re. 21,956 or 2,297,354. In these patents there is shown my method of retreading conventional tire casings having relatively thick and well defined shoulder portions with an intermediate transversely extending substantially cylindrical road-engaging tread portion which is relatively less in width in relation to the dimension of this type of tire than the relative width of the road-engaging tread portion of a shoulderless type tire casing in relation to the other dimension thereof. The transverse or axial configuration of the conventional tire tread is substantially cylindrical and in each of the above identified patents there is also shown a mold having a transversely flat, cylindrically shaped surface with tread material confining flanges at each edge thereof which provides for the retaining, molding and vulcanizing of the newly applied uncured camelback tread material between the flanges in a substantially cylindrical configuration and transversely flat condition. It is relatively easy to control the configuration of the camelback being applied to a conventional tire casing having well defined shoulder portions.

According to the patents identified above it is to be noted that it is essential and desirable to form and vulcanize the entire newly applied tread material to the casing of the conventional automobile or truck tire between the shouldered portions thereof and at substantially the rolling radius of the tire. A cylindrically shaped outer peripheral tread surface substantially flat in transverse of axial configuration will thus be provided to afford a desired road-engaging surface for such types of tires wherein the tread material in loaded use is under substantially uniform tension except at the base of the tire where the tread material is relaxed and will therefore offer the minimum resistance to rolling under weighted conditions, as compared with the tread of a conventional new tire.

In the retreading of pneumatic tire casings of the shoulderless type it is essential and desirable to provide the tread surface with a substantially transverse or axial arcuate configuration and further, one which will have the desired safety tensioned characteristics in the tread material of the former Hawkinson process as disclosed in the above identified patents, but wherein the tread material must cover a relatively greater transverse or axial width of the casing in relation to the other dimension thereof than the relative transverse or axial width of the road-engaging tread portion of a tire casing having well defined shouldered portions. Accordingly it is necessary in actual practice to provide the tire casing of the shoulderless type with a road engaging tread portion having a tensioned condition in the unloaded relaxed position which is a maximum at the longitudinal center of the tread portion which lies in a plane normal to the axis of the tire casing and decreases in quantity away from the longitudinal center line toward the point of juncture of the retreaded portion and side walls of the tire casing. At the point of juncture referred to above the retreaded portion is in a relaxed state being neither in compression or tension and at substantially the rolling radius of the tire casing. In the loaded position the retreaded portion of the shoulderless type of tire casing is in a state of compression which is a maximum at the longitudinal center of the tire casing and decreases toward the point of juncture of the retreaded portion and side walls with the retreaded portion adjacent the point of juncture having no compression and being substantially at the rolling radius of the tire casing. Consequently the method and apparatus disclosed in my previously cited patents will not perform the retreading operation necessary for pneumatic tire casings of the shoulderless type designed for airplane use and referred to herein. It will also be noted, with reference to said patent disclosures, identified above, that the casing of the pneumatic tire of the shoulderless type cannot have the beads thereof spread far enough apart in an axial direction to flatten the tread surface thereof and reduce the tire casing radius sufficiently for positioning the tire in a ring mold of a cylindrical configuration having the radius of the molding surface equal to the rolling radius of the tire casing. In this connection it should be noted that the beads of an airplane type tire cannot be so spread, i. e., first they are restricted in such a way as to physically prevent such spreading without "cloverleafing" of the side walls which causes serious deformation resulting in damage to the tire carcass, and secondly in the absence of such physical restriction the tread portion thereof to be retreaded is relatively substantially greater in transverse or axial width in respect to the other dimensions of such tire casing than the axial width of the tread portion of a conventional tire is in respect to the other dimensions thereof, and it would be necessary to spread the beads a much greater distance axially in order to uniformly flatten the tread portion and reduce the tire casing radius to the necessary cylindrical configuration for positioning in the mold. If a shoulderless pneumatic tire casing of the airplane type were to have the beads axially spread apart until the radius of the whole tread portion thereof equalled the rolling radius of the casing the side wall portions of the casing would buckle and cause the casing to "clover-leaf."

It is therefore the primary object of my invention to provide a method and mold for retarding worn tire casings of the shoulderless airplane type not only to renew the tread portion of the tire which extends to a materially greater transverse or axial width of the casing than in conventional automobile tires but also to place the retreaded portion in a desired transverse arcuate configuration on the shoulderless tire casing and provide a safer longer lasting tread portion than is provided by other known methods and means of making and/or retreading tires of this character.

A special object of my invention is therefore to provide a method and a mold for renewing the tread material of worn pneumatic tires of the shoulderless type whereby the new tread material is vulcanized to the side wall covering material and adjacent tire carcass while certain portions of the tread material are maintained under conditions approximating that of the rolling radius of the tire and also uniting the remaining new tread material and intermediate portions of the carcass under conditions maintained at greater than rolling radius but less than the normal inflated radius of a corresponding new tire.

Another object of my invention is to provide a method and mold for applying a new tread stock to a worn pneumatic tire casing of the shoulderless type wherein part of the retreaded portion of the tire casing is in a varying tensioned condition and the remaining part of the retreaded portion has no compression-tension condition in the relaxed unloaded state of the tire casing and part of the retreaded portion of the tire casing is in a varying state of compression and the remaining part of the retreaded portion has no compression-tension condition in the loaded state of the tire casing.

It has also been proposed in following the Hawkinson retreading method of the patents, identified above, that the mold may be arched or curved between the tread confining side flanges thereof and that the transverse arc of such mold may be of substantially the same degree as the arcuate shaped road-engaging tread portion of a shoulderless tire casing. First, because of the confining side flanges it was found necessary to have a single mold for each size of tire which obviously necessitated too great an expense in operation costs. Second, the industry was then confronted with actual distortion of the tire casing due to unequal pressures, both radially and axially being exerted and particularly against the tire casing at the axial peripheral edges of the mold which also caused bulging or "clover-leafing" of shoulderless penumatic tire casing side walls. Further, as the cylindrical ring molds have heretofore been designed and proportioned to vulcanize a new tread to a tire at the rolling radius of that tire, the mere reshaping of such molds transversely has further produced improper application of vulcanizing pressures to the new tread rubber as well as greatly excessive pressures to the bordering old rubber of the casing.

Accordingly a further object of my invention is to provide a tire mold having a transverse arcuate surface of such extent that it will project axially beyond the juncture of the side walls and new tread portion of the casing and thus be usable in the molding of transversely arcuately shaped road-engaging tread portions of pneumatic shoulderless tires of varying sizes.

A further object of this invention is to provide a transversely arcuate mold for curing the road-engaging tread portion of a pneumatic tire casing of the shoulderless type in the desired transversely or axially arcuate shape but wherein only the approximate marginal juncture of the tread and side wall portions are maintained at substantially the rolling radius of the tire whereby upon the insertion and expansion of the casing into the mold transversely equal pressure is exerted throughout the full transverse contact of the tread portion with the mold.

A still further object of my invention is to provide a method and means for retreading pneumatic tire casings of the shoulderless type wherein the newly applied and cured road-engaging tread portion material is so united and merged within the side wall covering material of the carcass that it is very difficult, if not impossible, to distinguish the juncture of the newly applied material with the remaining portions of the tire carcass thus giving the appearance of a new tire.

It has further been found that due to the specific and particular configuration, stated above, that when a pneumatic tire carcass or casing of the shoulderless type having continuous transversely arcuate road-engaging tread and side wall portions is retreaded in a conventional cast metal tread applying mold that the heat conducting means of such molds is maintained in forcible contact with the side wall portions of the tire casing. Hence, during the time required to vulcanize the new tread material the old side wall material will be over vulcanized to such extent as to cause definite checking and discoloration of the side walls.

Accordingly, a further object of this invention is to provide a method and specific mold for retreading a worn pneumatic tire carcass or casing of the shoulderless type having a transversely arcuate road-engaging tread portion so that there will be no possibility of heat checking or discoloration of the side wall portions of the casing.

Still another object of my invention is to provide a pneumatic tire casing of the shoulderless type with a retreaded portion having a desired compress-tension ratio providing that such retreaded portion will be at substantially the rolling radius of the tire casing when the casing is in a relaxed unloaded condition.

The above and still further advantages of retreading a shoulderless pneumatic tire casing in accordance with my invention will become more apparent from the following detailed description, appended claims and attached drawing.

Referring to the drawing wherein there is illustrated my invention and in which like characters indicate like parts throughout the several views:

Fig. 3 is a transverse section of a shoulderless pneumatic tire which has been prepared for retreading and which is about to be placed within my novel transversely arcuately shaped mold;

Fig. 4 is a view similar to that of Fig. 3 showing a further step in my novel method; and Fig. 5 is a comparison view showing the relative relation of the radii of the casing between the molding operation, the unloaded relaxed condition, and the loaded condition.

Figure 1:
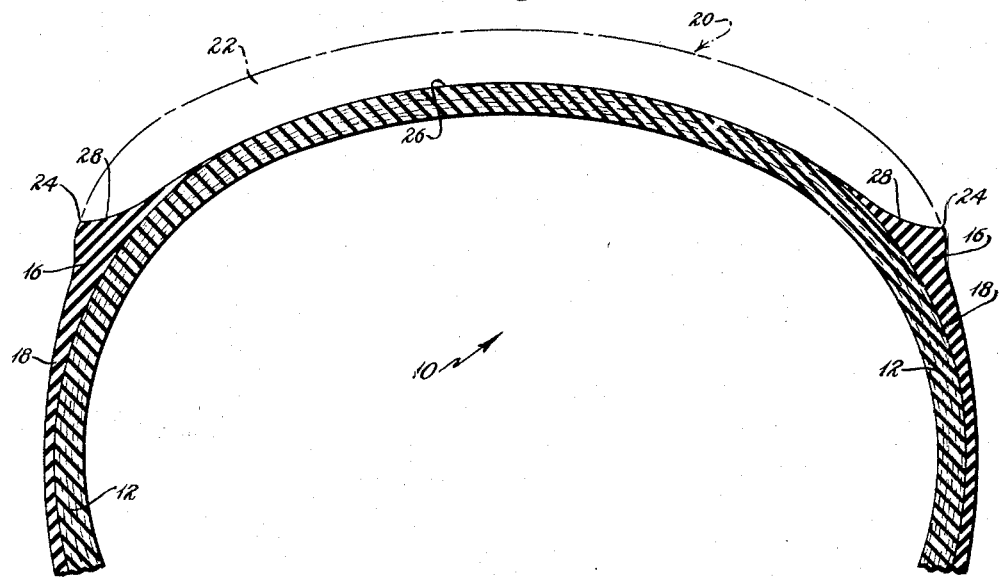
Fig. 1 is a sectional view of a pneumatic tire casing with the road engaging tread portion thereof buffed away in accordance with the principles of my novel method.

Referring in detail to the drawings and in particular to Fig. 1 there is shown a pneumatic tire casing 10 of the shoulderless type, such as is in common use upon airplanes, and which includes a cord carcass 12, rim engaging beads 14—14, note Fig. 3, a rubber outer covering, designated generally as 16, and side wall portions 18. It should be noted that the road-engaging covering tread portion 20, shown in Fig. 1 by dot-dash lines to indicate that such portion has been abraded away, of the shoulderless type tire casing 10 is transversely arcuate and merges into the side walls 18 of the casing in a substantially smooth outer surface. In such shoulderless type tire casings there are no thickened shoulder portions bordering on axial opposite sides of the tread portion which characterizes the conventional pneumatic automobile or truck tire.

It should be noted that pneumatic tires of the shoulderless type as described and illustrated herein are designed to carry an extremely low pressure of air, yet in use under load they will not create shoulders as the full transverse or axial width of the crown covering 22 between the points of joinder 24 will at one time or another be in contact with the runway. Therefore this entire portion of the tread covering will be gradually worn away by reason of repeated take-offs and landings of the airplane.

Hence, in such shoulderless tires as are illustrated, the landing and rolling radii are far less than is intended or practical in conventional tires, and it will therefore be noted that the transversely or axially arcuate road-engaging tread portion 20 extends transversely through an arcuate distance substantially relatively greater than the transverse substantially cylindrical distance of a conventional pneumatic automobile or truck tire when these distances are compared to the other dimensions of each tire respectively.

The first operational step in my novel method of applying a new transversely arcuate road-engaging tread-stock to the entire worn tread portion of the pneumatic tire casing 10 of the shoulderless type is to uniformly abrade or buff away the entire circumferential crown cover portion 22 intermediate the transversely or axially spaced annular circumferentially extending points of joinder 24 or opposite side walls of the casing. There is thus provided around the entire periphery of the casing an endless radially outwardly arched tread-stock receiving surface 26 which is transversely and circumferentially arcuate and uniformly radially spaced from the correspondingly shaped subjacent cord carcass 12 at every point thereon. This arcuate tread-stock receiving surface 26 is therefore of an axial or transverse width at least equal to and preferably greater than the normal ground engaging surface of the crown covering 22 as it extends transversely between the tread confining end walls 28 at points 24. The retread receiving surface 26 is therefore bounded on its axial opposite sides by relative short axially extending cylindrical extension surfaces or end walls 28 formed at the radial outer ends of the side covering 16 by the rubber remaining after buffing away the worn tread portion. These substantially cylindrical axially extending end surface 28 diverge from each other in normal position and provide for the tread-stock receiving surface 26 to extend transversely or axially beyond the radial inner surface of the rubber covering 16 of the side walls 18 adjacent the cord carcass 12.

As will be explained hereinafter, during the molding and curing of the retreaded road-engaging tread portion of the tire casing, the extension surfaces 28 change their relative position from the normal substantially axial disposition to a relative diverging radial outwardly position during insertion of the casing into the mold to a relative radially inwardly diverging position during the curing step whereby the extension surfaces are then placed in a confining position which retains the newly applied retread stock material as desired.

Figure 2:
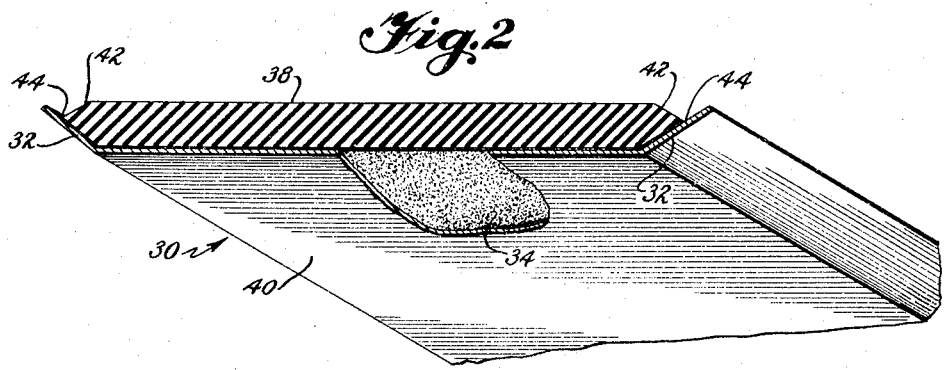
Fig. 2 is a perspective view in section of a portion of the camel-back with portions thereof broken away.

Further it should be noted that these cylindrical end wall extension surfaces 28 of the side wall covering material are disposed radially inwardly in relation to any part of the transversely arcuate circumferentially extending tread-stock receiving surface 26. Further, the thickness of these cylindrical end wall extension surfaces 28 is substantially equal to the thickness of the strip of retreading tread-stock or camel-back 30 which is to be applied to the tire casing, note Fig. 2. Such strip of camel-back is to be applied intermediate the cylindrical end wall extension surfaces 28 and cemented thereto as well as to the arcuately projecting tread-stock receiving surface 26. Preferably, the arcuate tread-stock receiving surface 26 is produced by uniformly buffing away the worn outer arcuate surface material of the pneumatic shoulderless tire casing 10 by a lathe type machine such as illustrated in my Patent No. 2,392,667, while the shoulderless tire is inflated to normal pressure. By this means all portions of the produced tread-stock receiving surface 26 are substantially radially equidistantly spaced from the axis of rotation of the shoulderless tire 10.

I have further found it preferable and I therefore desire to use for the purpose of buffing away the crown cover 22 a buffing head of the type disclosed in my Patent No. 2,240,559 in order to obtain an accurate and a properly conditioned vulcanizing surface on the tread-stock receiving surface 26 as well as on the cylindrical end wall extension surfaces 28. In any event, when the tire is so prepared as set forth above, the tread-stock receiving surface 26, as well as the extension surfaces 28, are coated with a suitable rubber cement and the arcuate space between the axially spaced extension surfaces 28 is filled with an uncured specially prepared tread-stock material 30, shown in Fig. 2. This tread-stock 30, which is frequently referred to in the vernacular of this art as "camel-back," has oppositely tapering side edge portions 32 and a radial inner surface 34. A tacky substance covers the radial inner surface 34 and also the tapering side edge portions 32. As is clearly shown in Fig. 2, the longitudinal extending tapering side edge portions 32 are beveled radially outwardly and axially outwardly away from the inner surface 34 so that the side edge portions will lie in registering axial relation with the cylindrical end wall extension surfaces 28 with which they are adapted to register when the intermediate body portion 36 of the camel-back 30 is applied and cemented to the transversely arcuate tread-stock receiving surface 26 and said tread confining end wall extension surfaces 28 of the tire casing 10.

The provision of the camel-back 30 with radially outwardly and axially outwardly beveled side edge portions 32 is opposite to the customary manner of forming and applying a retreading stock material to a tire casing. In this connection it should be understood that the conventional camel-back has its longitudinal side edges tapered radially outwardly and axially inwardly from the radial inner surface thereof and is further provided with a tacky surface on the opposite face of the camel-back, i. e., the face which has the larger transverse width. Therefore, it will be noted that the camel-back 30 of this invention has the tacky substance on the inner surface 34 which has a smaller transverse or arcuate width than the radial outer surface 38. As is customary the tacky inner surface 34 is covered with a removable protecting holland cloth 40 or the like. Further, and as shown, I preferably provide the edges of the radially outer or untapered face 38 of the tread stock 30 with a slight tapering surface 42 which converges with the first mentioned beveled face of the side edges 32 at points 44. The provision of the specific tapering of the edges at 32 and 40 of the tread stock 30 provides in conjunction with the registration thereof on the cylindrical extension surfaces 28 of the tire casing 10 a mating or corresponding joinder of the tread stock and rubber outer covering 16 which is very hard to distinguish when vulcanized according to this invention, and consequently my finished retreaded shoulderless pneumatic type tire casing appears to have a unitary monolithic outer rubber covering which gives the appearance of a new tire.

Attention is now directed to Fig. 3 wherein there is illustrated how well the uncured tread stock material 30 is merged with the cylindrical end wall extension surfaces 28 and united to the entire tread-stock receiving surface 26 to provide a perfect inlay thereof having a smooth transversely arcuate radial outer peripheral surface.

The cementing of the tread stock 30 to the surface 26 and end wall extension surfaces 28 in the position as shown in Fig. 3 is performed after removing the air bag used during the buffing step and prevents the tread-stock 30 from buckling circumferentially and transversely when the prepared tire casing is being inserted in the ring mold 46, to be explained later.

Therefore, after the camel-back tread-stock 30 has been thus cemented in place, the next step in my novel method is to place this prepared carcass in a tire bead spreading device indicated generally by the numeral 48 in Fig. 3, to reduce the normal radius R1 of the central peripheral tread portion of the tire casing for insertion into the ring type curing mold or matrix 46. It will be observed and should be noted that this mold or matrix 46 is of the same general and particular classification as the matrix disclosed in my patent 1,917,261. There are, however, several critical and important distinctions between my present mold 46 and that shown in the above-mentioned patent. These distinctions will be enumerated and dealt with hereinafter, and I would like at this time to enumerate on the features of the mold 46 which are substantially similar to my earlier patent. The mold 46 is shown as being provided with a plurality of parallel tread design forming ribs 50 which may be formed by folding the sheet metal band 52 into a U-shaped form. Further, heat is imparted to the mold 46 by means of a continuous spirally wound steam, or the like, conducting coils 54. In order to provide rigidity to the axial marginal edge portions of the instant flangeless mold in order to resist the forces exerted radially and axially thereagainst by the expansion of the shoulderless tire carcass 10 thereinto, the extreme axial outer side edges of the mold 46 are upturned and rolled, as shown at 56, to embrace reinforcing wires, or the like 58, which are secured to the mold 46 at this point of joinder with the upturned end portions 56.

The pertinent and distinguishing novel feature of my mold 46 over the mold or matrix disclosed in my Patent 1,917,261 is that there is provided a constant smooth transversely or axially extending arcuate surface 60 on the radial inner surface of the matrix 46. This constant and smooth transversely or axially arcuate surface 60 provides for the tread stock camel-back 30 of the prepared tire casing 10 to be molded and cured in the proper desired transversely or axially arcuate road engaging tread position, i. e., the curved tread portion of the shoulderless tire casing is transversely or axially arcuate and closely approximates the rolling radius of the casing under loaded conditions. Since it is desired to have the retreaded tire casing 10 provided with a desired specific transversely or axially arcuate road engaging tread surface, the mold is shaped in the above disclosed and described transversely or axially arcuate surface 60. The transverse or axial arc of the surface 60 has a radius $R^2$ smaller than the radius $R^1$ of the transversely arcuate road engaging tread surface of the original shoulderless tire casing under normal relaxed unloaded conditions. However, it should be further noted that the mold 46 has a plurality of transverse or axial radii $R^2$, $R^3$, $R^4$, which vary in distance and are measured from the axis of rotation of the tire casing 10 and provide the mold with the smooth peripheral surface 60 which is transversely or axially arcuate. The transverse or axial radii of the matrix or mold 46 are critical at these three points. No single transverse or axial radius of the mold is greater than the radius $R^1$ of the tire casing under normal inflated unloaded conditions. In fact, all of the transverse or axial radii of the mold are substantially less than the corresponding normal inflated unloaded radius $R^1$ of the tire 10. The radius $R^2$ of the mold is less than the normal corresponding radius of the tire casing but greater than the rolling radius $R^5$ of the tire casing under loaded conditions, which is designated A—A in Figs. 3-4. The radii $R^3$ of the mold which are opposite the joinder points 24 are substantially equal to the rolling radius $R^5$ of the tire casing 10. The radii $R^4$ of the mold are greater than the corresponding radii of the tire casing 10 and less than the rolling radius $R^5$. The rolling radius $R^5$, line A—A, of a tire casing under loaded condition is in effect a plane since in most instances the road bed upon which the tire casing rolls is a smooth surface. When retreading tires of the conventional automobile or truck type having well defined shoulder portions all that is necessary to vulcanize the tread material to such casings at the rolling radius is to provide the mold with a cylindrical surface having a radius substantial equal to the rolling radius of the tire. However, in tires of the shoulderless type the road engaging tread portion is more transversely arcuate through a greater proportional axial distance than the tread portion of tires having well defined shoulder portions and under loaded condition the tread portions of shoulderless tires are forced radially inwardly a greater proportional distance. The configuration of a shoulderless tire casing under loaded conditions is substantially the same as a tire casing having well defined shoulder portions. For these reasons it is readily seen that great difficulty is had in providing a shoulderless tire casing having a transversely or axially arcuate road engaging tread portion with a retreaded road engaging surface which is transversely radially curved and also having a radius equal to the rolling radius of the tire. This specific configuration of my novel mold provides for the final tread portion of the casing to be vulcanized at substantially the rolling radius of the shoulderless tire casing. From the above it will be noted that the axial radial inner points 60 of the mold 48 lie in the plane of the rolling radius of the tire.

It should also be noted that the mold 46 is not provided with any type of tread stock material confining radially extending flanges adjacent the points 60. It should be remembered that the edge portions 32 of the tread stock 30 do not extend radially beyond the peripheral outer surface of the rubber outer casing 16 of the shoulderless tire casing 10. For this reason it is not necessary to provide a transverse or axial confining means in order to confine the tread stock 30 within the confines of the cylindrical extending surfaces 28 and tread-stock receiving surface 26. If such a radially inwardly extending tread stock transversely axially confining means were employed the radial extension thereof would exert pressures into and against the side wall portions 18 adjacent the joinder points 24, and these pressures would not be equal to the pressure exerted by the tire tread portion against the mold 46 intermediate the points 60 of the mold. This unequal pressure would cause bulging or clover-leafing of the side walls 18 near the points of joinder 24.

Accordingly it should be noted that the mold 46 is of a transverse or axial arcuate width considerably greater than the transverse or axial width of the shoulderless type tire casing measured between the portions of joinder 24. Further, it should be noted that there is provided intermediate the axially spaced points 60 and the upturned edges 56 of the mold substantially smooth transversely arcuate extension surfaces 62. The engagement of the shoulderless tire carcass 10 and the mold 46 will be described later.

It should further be noted that no part of the spirally wound heat conducting coil 54 extends beyond the axially spaced points 60 of the mold so that there is no heat applied directly to the extension portions 62 of the mold 46. This avoids the likelihood of checking occuring on the side walls 18 of the tire casing.

Having thus described in particular the specific configuration of my novel mold it should be noted that the transversely arcuate shape 60 of the mold 46 will not preclude the tire casing 10 from being inserted therein through the axial openings on either side thereof.

In order to so insert the shoulderless tire casing 10 into the mold the next step in my novel method is to spread the beads 14 thereof transversely or axially apart from each other by means of a spreading device 64, or the like, in order to reduce the circumferential or peripheral dimension of the tire casing 10. The tire casing having been reduced in size to less than the circumferential distance measured along the upturned edges 56 of the mold 46, the tire casing 10 is then placed within the mold as shown in Fig. 3.

Having placed the shoulderless tire casing 10 having the tread stock 30 secured in proper position thereon within the mold 46, the beads 14 are permitted to be moved axially inwardly toward each other to assume their normal axially spaced relation and to place the newly applied uncured curable tread stock material 30 adjacent the inner surface 60 of the mold 46. In such position the portions of joinder 24 are in radial alignment with the axially spaced points 60 of the mold and the side walls 18 of the tire are aligned with the smooth transversely arcuate axially outer extension surfaces 62. The tire casing 10 is then expanded into contact with the mold 46 as shown in Fig. 4.

It is to be specifically noted that the tread design-forming flanges or ribs 50 come into contact only with the newly applied tread stock material 30, and all ribs 50 are intermediate the axially spaced axially extending cylindrical surfaces 30 of the tire casing. In order to retain the tread stock material 30 within its proper confines it should be noted that the points of joinder 24 make contact with the smooth transversely arcuate extension surfaces 62 of the mold, and that this contact in conjunction with the change of relative position of the axial outer edges of the normally axially extending cylindrical surfaces 28 to a radially outwardly position which restrains and confines the tread stock material 30 from any axial or transverse movement within the tread-stock receiving surface 26.

By providing my mold 46 with the smooth transversely arcuate extension surfaces 62 there is provided assurance that the pressure exerted by the tire casing against the mold 46 is radially equal throughout the full transversely arcuate contact of the shoulderless tire casing 10 and mold 46. It should be noted that the portions of the smooth transversely arcuate extension surfaces 62 which are opposed to the portions of joinder 24 have a radius substantially equal to the rolling radius $R^5$ of the shoulderless tire casing 10. Further, it should be noted that the arcuate surface 60 of the mold 46 intermediate the smooth transverse arcuate extension surfaces 62 has radii designated $R^2$, $R^3$ and $R^4$, each of which is substantially less than the corresponding normal radius of the tire casing in a relaxed condition but slightly greater than the rolling radius $R^5$ of the shoulderless tire casing 10. Thus, there is provided a retreaded transversely or axially arcuate shaped circumferentially extending tread portion for a shoulderless pneumatic tire which has been vulcanized thereto in a condition which approximates that of the rolling radius of the tire casing since the axially spaced edges of the tread stock have been vulcanized at the rolling radius of the tire casing and the intermediate portion of the tread stock has been vulcanized in a condition approximating the rolling radius of the tire casing, it being appreciated that it is difficult to retread a shoulderless pneumatc tire casing having the road engaging tread portion thereof which extends throughout a relative greater transverse arc or axial width in relation to the other dimensions of the tire casing so that the tread portion thereof is vulcanized at the rolling radius of the tire casing, since the tread portion must be vulcanized thereto in a transversely or axially arcuate position and that the actual rolling radius of such a tire casing is a plane surface instead of an arcuate surface.

Having thus positioned the tire casing 10 within the mold 46, a conventional inner tube 66 is placed within the shoulderless tire casing 10 and the casing is mounted on a conventional rim 68. In addition and in my preferable method there is further provided side pressure plates 70 of the type illustrated in my Patent No. 2,034,618 which are utilized to relieve the side walls 18 of excessive pressure which is applied by the inner tube 66 during the curing process.

Heat is now applied to the mold 46 by means of the coil 54 and the uncured curable tread stock material 30 is vulcanized and cured in the desired position and united to the shoulderless tire casing 10.

From the foregoing it will be understood that a shoulderless tire casing having a transversely or axially arcuate road engaging tread portion which has been retreaded according to my novel method and using my novel mold will be provided with a tread which will be cured in a condition with the radii adjacent the axial edges thereof substantially equal to the rolling radius of the tire and the radii intermediate the axial edges of the tread portion approximately equal to the rolling radius and less than the corresponding radii of the original transversely arcuate tread portion. This specific condition of the newly applied tread portion is advantageous since by so conditioning the rubber thereof there are less compression forces placed in the tread of the tire when in loaded condition. The original transversely or axially arcuate tread portion of the shoulderless tire, when loaded, is compressed both transversely and circumferentially throughout the full transverse or axial width since all of the radii of such a tread portion are greater than the rolling radius of the tire casing. In its normal unloaded condition the tread portion of such tire is in a neutral or unstressed condition.

A shoulderless tire having a transversely arcuate tread portion which has been retreaded in accordance with the disclosure of this invention has the rubber of the retreaded road engaging tread portion in a different condition than the tread portion of the original tire, stated above. The transversely or axially arcuate tread portion of a shoulderless tire retreaded in accordance with this invention has the rubber thereof which is adjacent the axial edges of the tread portion in a neutral condition and the rubber intermediate the axial edges varies transversely or axially inwardly from a minimum to a maximum state of compression when the tire is loaded. However, the maximum state of compression of the tread rubber of a tire retreaded in accordance with this invention is substantially less than the compression of the tread rubber of the tread portion of the original tire. In an unloaded condition the rubber of the transversely or axially arcuate tread portion of a shoulderless tire retreaded in accordance with this invention is under tension, the tension forces being a minimum at the axial edges of the retreaded portion and varying axial inwardly and increasing to a maximum at the longitudinal center of the retreaded portion of the tire. The only portion of the retreaded tire casing of this invention is that in a neutral or unstressed condition is the retreaded portion adjacent the axial edges when the tire is loaded.

Further, by following my novel method and using my novel mold disclosed I have provided a commercially successful and acceptable method and mold to cure a transversely or axially arcuate tread portion of a shoulderless pneumatic tire substantially at the rolling radius of the tire. I have further, by reason of my specific novel mold, having the axial extension surfaces thereon, been able to utilize a limited engagement of the old rubber of the side walls of the carcass to retain the newly applied tread stock material in place during the curing step. Further, my novel mold is of such specific configuration and structure so that the extension surfaces of the mold are of such transverse or axial width and shape providing for the use of such mold on tire casings of various sizes. Further, the axial extension surfaces of the mold and the transverse or axially arcuate shape thereof eliminates the necessity of radially inwardly extending edge flanges and prevents buckling and "clover-leafing" of the cords of the carcass side walls during the curing step and since the side walls engage directly the unheated mold extension surfaces checking of the side wall due to heat is prevented.

Having thus shown and described a preferred embodiment of my invention it is obvious that any modified construction thereof having the structure defined by the claims will not depart from the spirit of the claims.

What is claimed is:

1. A shoulderless tire casing having a retread bonded thereto, said retread extending transversely across the casing a distance substantially equal to the transverse width of the flat ground engaging area at rolling radius of the casing, said casing having outwardly inclined substantially axially extending retread stock edge engaging and confining portions engaging and bonded to the longitudinal edges of the retread, said retread having correspondingly beveled side edges, the outer surface of the retread being on longitudinal and transverse arcs substantially uniformly spaced from the corresponding longitudinal and transverse arcs of the inner periphery of the casing, said retread being under a varying tensioned condition when said casing is unloaded and under a varying state of compression when said casing is loaded, said tensioned condition and state of compression being a maximum at the longitudinal center of the retread and decreasing in quantity uniformly axially therefrom, said retread being fully relaxed, unstressed and at approximately the rolling radius of the casing adjacent to and axially inwardly from said retread beveled side edges.

2. A pneumatic tire casing of the shoulderless type, said casing having spaced side wall portions and a road engaging tread portion extending between the side wall portions and joined thereto along axially spaced circumferentially extending junctures, said tread portion being in a tensioned condition which varies axially thereacross intermediate the junctures when said casing is unloaded and inflated, said tensioned condition being a maximum adjacent the longitudinal center of the tread portion and decreasing in quantity uniformally axially therefrom toward the junctures, said tread portion adjacent the junctures being fully relaxed, unstressed and at approximately the rolling radius of the casing.

3. A pneumatic tire casing of the shoulderless type, said casing having spaced side wall portions and a road engaging tread portion extending between the side wall portions and joined thereto along axially spaced circumferentially extending junctures, said tread portion being in a state of compression which varies axially thereacross intermediate the junctures when said casing is loaded and inflated, said state of compression being at a maximum adjacent the longitudinal center of the tread portion and decreasing in quantity uniformly axially therefrom toward the junctures, said tread portion adjacent the junctures being fully relaxed, unstressed and at approximately the rolling radius of the casing.

References Cited in the file of this patent

UNITED STATES PATENTS

| | | |
|---|---|---|
| Re. 21,956 | Hawkinson | Nov. 25, 1941 |
| 1,625,284 | Seaton | Apr. 19, 1927 |
| 1,945,098 | Thorburn | Jan. 30, 1934 |
| 1,987,350 | Reel | Jan. 8, 1935 |
| 2,292,286 | Owen | Aug. 4, 1942 |
| 2,297,354 | Hawkinson | Sept. 29, 1942 |
| 2,501,493 | Beward | Mar. 21, 1950 |
| 2,675,855 | Heintz | Apr. 20, 1954 |
| 2,697,472 | Hawkinson | Dec. 21, 1954 |